(12) United States Patent
Lu et al.

(10) Patent No.: US 11,837,753 B2
(45) Date of Patent: Dec. 5, 2023

(54) BATTERY

(71) Applicants: ZHONGSHAN WAN ENERGY TECHNOLOGY CO., LTD, Zhongshan (CN); Haijun Lu, Zhongshan (CN)

(72) Inventors: Haijun Lu, Zhongshan (CN); Pengdong Li, Zhongshan (CN)

(73) Assignees: Zhongshan Wan Energy Technology Co. Ltd., Zhongshan (CN); Haijun Lu, Zhongshan (CN)

( * ) Notice: Subject to any disclaimer, the term of this patent is extended or adjusted under 35 U.S.C. 154(b) by 0 days.

(21) Appl. No.: 17/419,097

(22) PCT Filed: Dec. 1, 2020

(86) PCT No.: PCT/CN2020/133145
§ 371 (c)(1),
(2) Date: Jun. 28, 2021

(87) PCT Pub. No.: WO2022/041541
PCT Pub. Date: Mar. 3, 2022

(65) Prior Publication Data
US 2023/0178857 A1    Jun. 8, 2023

(30) Foreign Application Priority Data
Aug. 31, 2020   (CN) .......................... 202021865149.3

(51) Int. Cl.
*H01M 50/503* (2021.01)
*H01M 50/107* (2021.01)
(Continued)

(52) U.S. Cl.
CPC ....... *H01M 50/503* (2021.01); *H01M 50/107* (2021.01); *H01M 50/533* (2021.01); *H01M 50/536* (2021.01); *H01M 50/538* (2021.01)

(58) Field of Classification Search
CPC ............. H01M 50/503; H01M 50/107; H01M 50/538; H01M 50/533; H01M 50/536
See application file for complete search history.

(56) References Cited

FOREIGN PATENT DOCUMENTS

| CN | 101978530 | * | 2/2011 |
|---|---|---|---|
| CN | 205723693 | | 11/2016 |

(Continued)

OTHER PUBLICATIONS

CN106784974MT (Year: 2017).*

(Continued)

*Primary Examiner* — Alexander Usyatinsky
(74) *Attorney, Agent, or Firm* — Gottlieb, Rackman & Reisman, P.C.

(57) ABSTRACT

A battery is disclosed including: a battery body, where a first electrode end plate and a second electrode end plate are disposed at two ends of the battery body respectively, a connecting sleeve is disposed on the first electrode end plate, and the second electrode end plate has a contour edge extending along a length direction of the battery body and away from the battery body, to define a first mounting countersink; and the connecting sleeve can be detachably connected to a first mounting countersink of another battery, and the connecting sleeve has an electrical contact surface at a free end that is in surface contact with the second electrode end plate.

8 Claims, 5 Drawing Sheets

(51) Int. Cl.
*H01M 50/538* (2021.01)
*H01M 50/533* (2021.01)
*H01M 50/536* (2021.01)

(56) References Cited

FOREIGN PATENT DOCUMENTS

| | | | |
|---|---|---|---|
| CN | 106784974 | * | 5/2017 |
| CN | 208738382 | | 4/2019 |
| CN | 111435726 | | 7/2020 |
| CN | 211295167 | | 8/2020 |
| JP | H08298107 | * | 11/1996 |
| JP | 2000013805 | * | 6/1998 |
| JP | H11339761 | | 12/1999 |
| JP | 2000138051 | | 5/2000 |

OTHER PUBLICATIONS

JPH08298107MT (Year: 1996).*
CN 101978530 (Year: 2011).*
Written Opinion for PCT/CN2020/133145 dated May 24, 2021.
International Search Report for PCT/CN2020/133145 dated Jun. 1, 2021.

* cited by examiner

BATTERY

CROSS-REFERENCE TO RELATED APPLICATIONS

This application is a national stage filing under 35 U.S.C. § 371 of international application number PCT/CN2020/133145, filed Dec. 1, 2020, which claims priority to Chinese patent application No. 2020218651493 filed Aug. 31, 2020. The contents of these applications are incorporated herein by reference in their entirety.

TECHNICAL FIELD

The disclosure relates to a battery.

BACKGROUND

At present, to mechanically connect a plurality of batteries together, it is common practice that a metal connecting post and a metal connecting sleeve are arranged at the center of a positive electrode end and a negative electrode end of a battery body respectively, so that every two adjacent batteries are connected to each other through the matching between the metal connecting post and the metal connecting sleeve. However, contact end faces of the metal connecting post and the metal connecting sleeve are small in area, resulting in an increase of resistance value after interconnection of the plurality of batteries, and thus resulting in a low charge-discharge efficiency of the battery pack and affecting performance of the battery pack.

SUMMARY

The disclosure is intended to solve at least one of technical problems in the existing technologies. For this purpose, the disclosure provides a battery with low internal resistance and high rate after interconnection.

A battery according to embodiments of the disclosure includes: a battery body, where a first electrode end plate and a second electrode end plate are disposed at two ends of the battery body respectively, a connecting sleeve is disposed on the first electrode end plate, and the second electrode end plate has a contour edge extending along a length direction of the battery body and away from the battery body, to define a first mounting countersink; and the connecting sleeve can be detachably connected to a first mounting countersink of another battery, and the connecting sleeve has an electrical contact surface at a free end that is in surface contact with the second electrode end plate.

The battery according to embodiments of the disclosure at least has the beneficial effects as below.

In the battery of the aforesaid structure, the connecting sleeve is disposed at the first electrode end plate of the battery body, and the first mounting countersink that matches the connecting sleeve and has a contour dimension similar to that of the battery body is disposed in the second electrode end plate of the battery body. When two adjacent batteries are connected, the connecting sleeve of one battery is disposed in the first mounting countersink of the other battery, and the electrical contact surface of the connecting sleeve can be in surface contact with the second electrode end plate. The above structure facilitates increasing the contact area when adjacent batteries are connected, so that the internal resistance of batteries can be reduced, thereby realizing the technical effect of high rate.

In some embodiments of the disclosure, the first mounting countersink is provided with a first internal thread on an inner wall surface, and the connecting sleeve is provided with a first external thread matching the first internal thread.

In some embodiments of the disclosure, the first electrode end plate has a contour edge extending along the length direction of the battery body and away from the battery body, to define a second mounting countersink, and the connecting sleeve is detachably disposed in the second mounting countersink.

In some embodiments of the disclosure, the second mounting countersink is provided with a second internal thread on an inner wall surface, and the connecting sleeve is provided with a second external thread matching the second internal thread.

In some embodiments of the disclosure, the connecting sleeve includes a cylindrical part, and the electrical contact surface is arranged on a lower end face of the cylindrical part and extends inwards to close or shrink a lower opening of the cylindrical part.

In some embodiments of the disclosure, a winding core assembly is disposed in the battery body, the winding core assembly is formed by sequentially overlapping a positive electrode membrane, a first insulating film, a negative electrode membrane and a second insulating film and wound into several turns, each turn of the positive electrode membrane is connected to a respective first electrode plate that extends out of the winding core assembly, the first electrode plates are all connected to a first converging piece, the first converging piece is electrically connected to the second electrode end plate, each turn of the negative electrode membrane is connected to a respective second electrode plate that extends out of the winding core assembly, the second electrode plates are all connected to a second converging piece, and the second converging piece is electrically connected to the first electrode end plate.

In some embodiments of the disclosure, the battery body includes a barrel-shaped housing, the first electrode end plate and the second electrode end plate are disposed at two ends of the barrel-shaped housing respectively to form a housing assembly, the winding core assembly is accommodated in the housing assembly, the first converging piece is clamped between the winding core assembly and the second electrode end plate, and the second converging piece is clamped between the winding core assembly and the first electrode end plate.

In some embodiments of the disclosure, one of the positive electrode membrane and the negative electrode membrane protrudes upward from the integral winding core assembly, and the other protrudes downward from the integral winding core assembly.

In some embodiments of the disclosure, the first electrode plate is fixed by welding to the first converging piece, and the second electrode plate is fixed by welding to the second converging piece.

Additional aspects and advantages of the disclosure will be partly given in the description below. This part will become clear in the following description or will be understood by practice of the disclosure.

BRIEF DESCRIPTION OF DRAWINGS

The aforesaid and/or additional aspects and advantages of the disclosure will become clear and easy to understand from the description of the embodiments in conjunction with the following accompanying drawings, in which.

DETAILED DESCRIPTION

Figure 1:
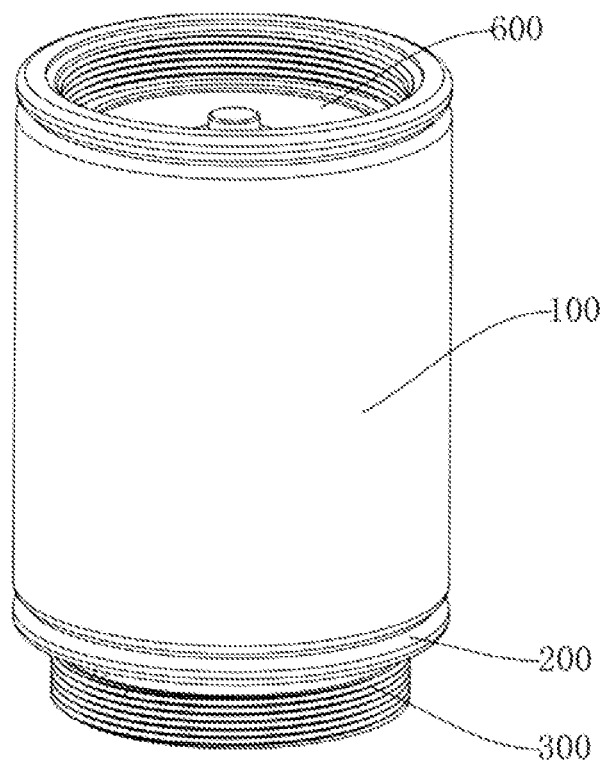
FIG. 1 is a schematic appearance diagram according to an embodiment of the disclosure.

The embodiments of the present disclosure are described in detail as below. Examples of the embodiments are illustrated in the drawings. Identical or like reference numerals represent identical or like elements or elements that have identical or like functions from beginning to end. The embodiments as described below with reference to the accompanying drawings are exemplary and are merely for interpreting the present disclosure and should not be understood as limiting the present disclosure.

In the description of the disclosure, it should be understood that the orientation or positional relationships referred to, e.g., the terms "upper", "lower", "front", "rear", "left", "right", "vertical", "horizontal", "top", "bottom", "inner", "outer", etc. are the orientation or positional relationships as shown in the accompanying drawings and are merely for convenience in describing the disclosure and simplifying this description, but not to indicate or imply that a device or element referred to must have a particular orientation and be constructed and operated in a particular orientation, and thus they should not be construed as limiting the disclosure.

In the description of the disclosure, the term "several" means one or more, the term "a plurality of" means two or more, the terms "greater than", "less than", "exceed", etc. are interpreting as excluding this number, and the terms "above", "below", "within", etc. are interpreting as including this number. The terms "first" and "second", if stated, are only used for the purpose of distinguishing technical features, and they cannot be understood as indicating or implying relative importance or implicitly indicating the number of technical features indicated or implicitly indicating the precedence relationship of technical features indicated.

In the description of the disclosure, unless otherwise specified and defined, it should be noted that the terms "mount", "interconnect" and "connect" are to be understood broadly. For example, it may be fixed connection, detachable connection or integral connection; may be mechanical connection or electrical connection; may be direct connection, or indirect connection by an intermediate medium, or may be interconnection within two elements. The specific meaning of the above terms in the disclosure may be understood by those having ordinary skill in the art.

Referring to FIGS. 1-4, a battery according to embodiments of the disclosure includes: a battery body 100, where a first electrode end plate 200 and a second electrode end plate 600 are disposed at two ends of the battery body 100 respectively, a connecting sleeve 300 is disposed on the first electrode end plate 200, and a contour edge 603 of the second electrode end plate 600 extends along the length direction of the battery body 100 and away from the battery body 100, to define a first mounting countersink 601; and the connecting sleeve 300 can be detachably connected to a first mounting countersink 601 of another battery, and the connecting sleeve 300 forms an electrical contact surface 301 at a free end that is in surface contact with the second electrode end plate 600. The battery body 100 may be of a cylindrical shape, or a prismatic shape, which is not limited herein.

In the battery of the aforesaid structure, the connecting sleeve is disposed at the first electrode end plate of the battery body, and the first mounting countersink that matches the connecting sleeve and has a contour dimension similar to that of the battery body is disposed in the second electrode end plate of the battery body. when two adjacent batteries are connected, the connecting sleeve of one battery is disposed in the first mounting countersink of the other battery, and the electrical contact surface of the connecting sleeve can be in surface contact with the second electrode end plate. The above structure facilitates increasing the contact area when adjacent batteries are connected, so that the internal resistance of batteries can be reduced, thereby realizing the technical effect of high rate.

Figure 2:
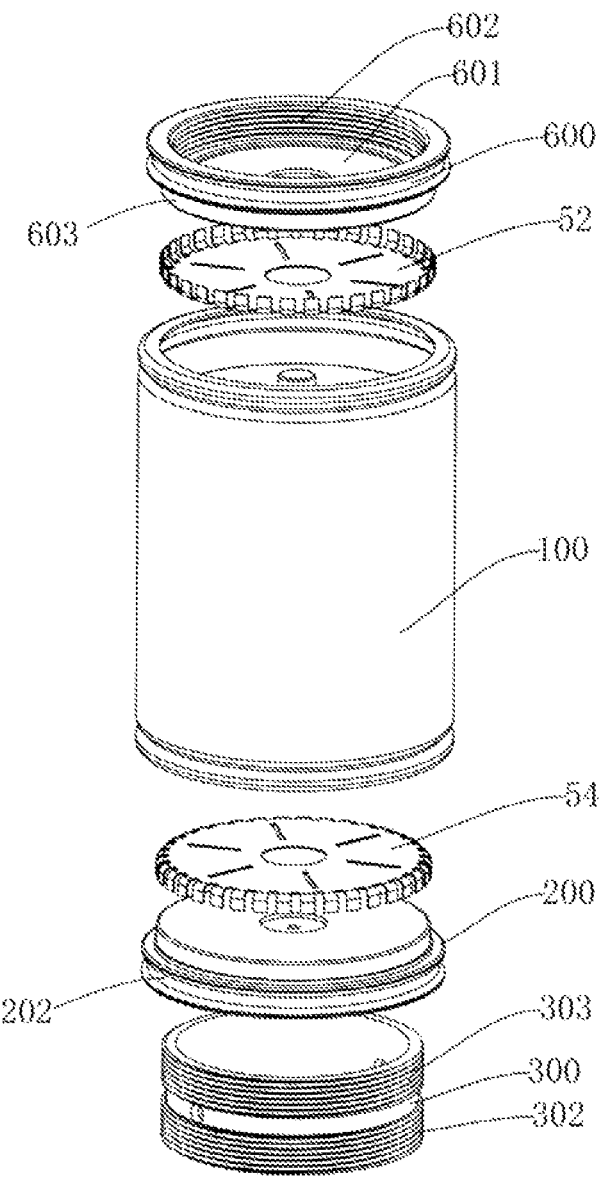
FIG. 2 is an exploded schematic diagram of the structure of FIG. 1.

Referring to FIG. 2, in some embodiments of the disclosure, to make the connecting sleeve 300 of one battery rapidly, firmly and detachably connected to another battery, a first internal thread 602 is formed on the inner wall surface of the first mounting countersink 601, and a first external thread 302 matching the first internal thread 602 is formed on the connecting sleeve 300. In other embodiments, the detachable connection between the connecting sleeve 300 and the first mounting countersink 601 may also be, of course, replaced with a buckle connection, etc.

Figure 3:
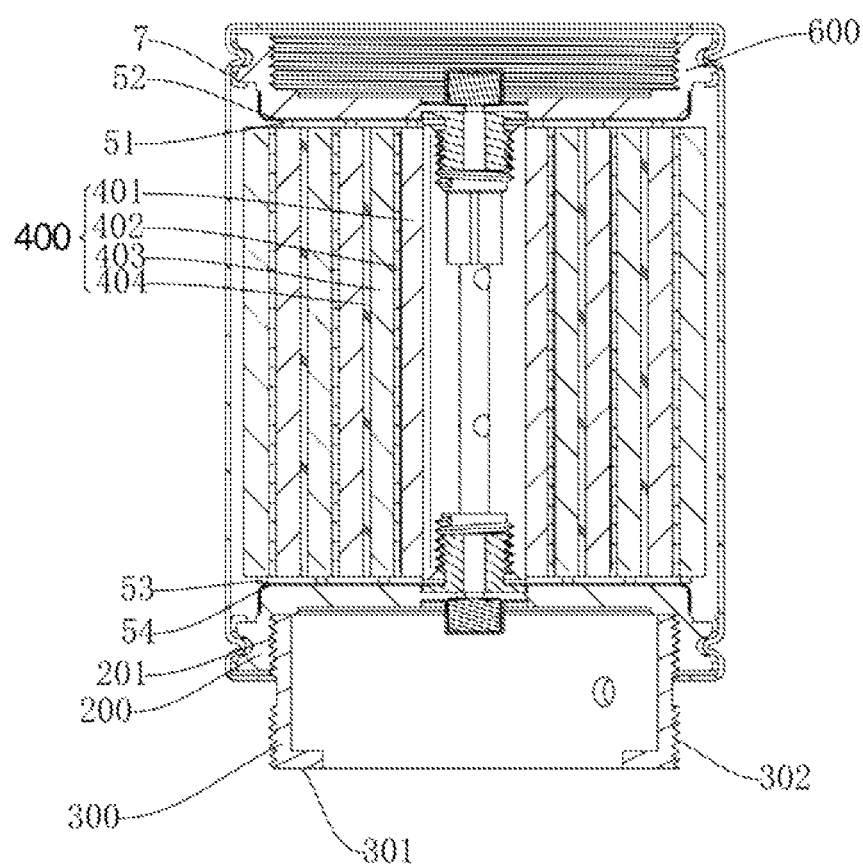
FIG. 3 is a schematic diagram of an internal structure according to an embodiment of the disclosure.
Figure 4:
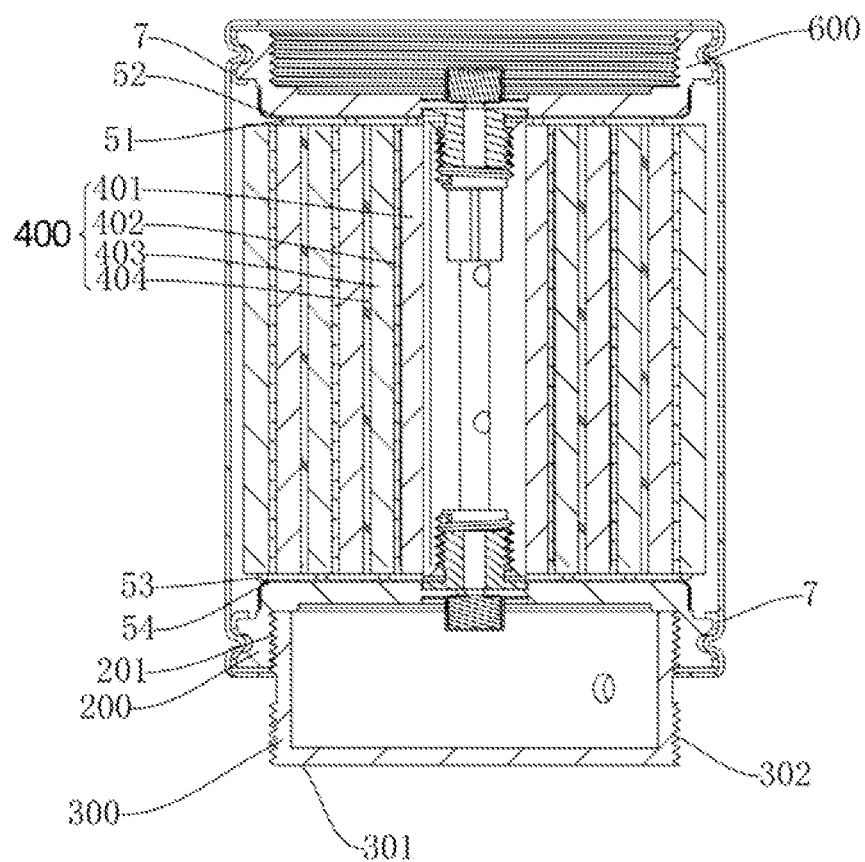
FIG. 4 is a schematic diagram of an internal structure according to another embodiment of the disclosure.

Referring to FIG. 3 or FIG. 4, in some embodiments of the disclosure, a contour edge 202 of the first electrode end plate 200 extends along the length direction of the battery body 100 and away from the battery body 100, to form a second mounting countersink, and the connecting sleeve 300 is detachably disposed in the second mounting countersink, so that the battery according to the embodiments of the disclosure can be used individually or the battery in several batteries in series connection can be replaced.

Referring to FIG. 3 or FIG. 4, in some embodiments of the disclosure, to facilitate the rapid mounting or demounting of the connecting sleeve 300 on the battery, a second internal thread 201 is formed on the inner wall surface of the second mounting countersink, and a second external thread 303 matching the second internal thread 201 is formed on the connecting sleeve 300. In other embodiments, the detachable connection between the connecting sleeve 300 and the second mounting countersink may also be, of course, replaced with a buckle connection, etc.

Referring to FIG. 3, in an embodiment of the disclosure, the connecting sleeve 300 includes a cylindrical part, and the electrical contact surface 301 is arranged on a lower end face of the cylindrical part and extends inwards to shrink a lower opening of the cylindrical part. Referring to FIG. 4, in another embodiment of the disclosure, the electrical contact surface 301 is arranged on the lower end face of the cylindrical part and extends inwards to close the lower opening of the cylindrical part. The two embodiments may both further increase the area of the electrical contact surface 301 and further reduce the internal resistance of the battery.

Referring to FIG. 3 or FIG. 4, in some embodiments of the disclosure, the battery is a Ni-MH battery, a winding core assembly 400 is disposed in the battery body 100, and the winding core assembly 400 is formed by sequentially overlapping a positive electrode membrane 401, a first insulating film 402, a negative electrode membrane 403 and a second insulating film 404 and wound into several turns. To avoid the increase of internal resistance caused by the traditional connection between the positive electrode membrane 401 and the second electrode end plate 600 by only one electrode plate, each turn of the positive electrode membrane 401 is connected to a first electrode plate 51 that extends out of the winding core assembly 400, the first electrode plates 51 are all connected to a first converging piece 52, and the first converging piece 52 is electrically connected to the second electrode end plate 600. To avoid the increase of internal resistance caused by the traditional connection between the negative electrode membrane 403 and the first electrode end plate 200 by only one electrode plate, each turn of the negative electrode membrane 403 is connected to a second electrode plate 53 that extends out of the winding core assembly 400, the second electrode plates 53 are all connected to a second converging piece 54, and the second converging piece 54 is electrically connected to the first electrode end plate 200. Therefore, the charge-discharge efficiency of the battery is further improved.

In some embodiments of the disclosure, the battery 100 includes a barrel-shaped housing, and the first electrode end plate 200 and the second electrode end plate 600 are disposed at the two ends of the barrel-shaped housing respectively to form a housing assembly. Insulating seal rings 7 are disposed between the barrel-shaped housing and the first electrode end plate 200 and between the barrel-shaped housing and the second electrode end plate 600 respectively, the winding core assembly 400 is accommodated in the housing assembly, the first converging piece 52 is clamped between the winding core assembly 400 and the second electrode end plate 600, and the second converging piece 54 is clamped between the winding core assembly 400 and the first electrode end plate 200. Therefore, instable electrical connection is avoided.

Figure 5:
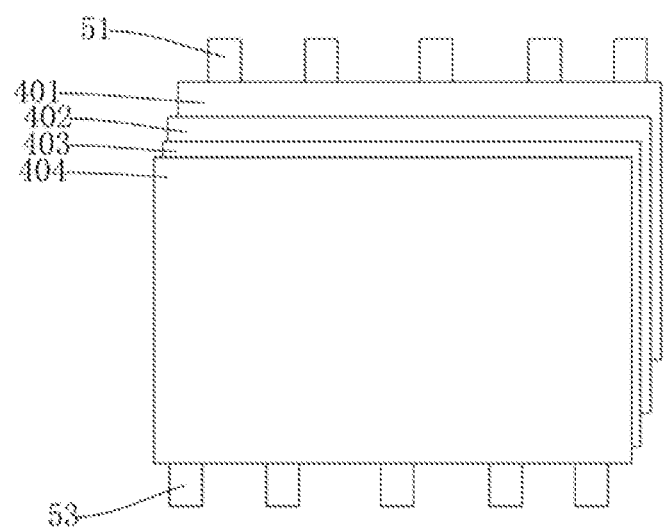
FIG. 5 is a schematic structural diagram of a combination of an expanding embodiment of a winding core assembly with a first electrode plate and a second electrode plate.

Referring to FIG. 5, in some embodiments of the disclosure, one of the positive electrode membrane 401 and the negative electrode membrane 403 protrudes upward from the integral winding core assembly 400, and the other protrudes downward from the integral winding core assembly 400. Therefore, the first electrode plate 51 and the second electrode plate 53 are routed outwards conveniently, and a production process of the battery is simplified.

In some embodiments of the disclosure, to make sure the stable connection between the first electrode plate 51 and the first converging piece 52, the first electrode plate 51 is fixed by welding to the first converging piece 52. To make sure the stable connection between the second electrode plate 53 and the second converging piece 54, the second electrode plate 53 is fixed by welding to the second converging piece 54.

The technical features of the embodiments described above may be arbitrarily combined, and for the sake of brevity of the description, not all possible combinations of the technical features of the embodiments described above are described. However, as long as the combination of these technical features is not contradictory, it should be considered as falling within the scope of this specification.

Although the embodiments of the disclosure have been illustrated and described, it should be understood by those having ordinary skill in the art that various changes, modifications, replacements and variations of these embodiments can be made without departing from the principle and purpose of the disclosure and the scope of the disclosure is defined by claims and its equivalents.

What is claimed is:

1. A battery, comprising:
a battery body, wherein a first electrode end plate and a second electrode end plate are disposed at two ends of the battery body respectively, a connecting sleeve is disposed on the first electrode end plate, and the second electrode end plate has a contour edge extending along a length direction of the battery body and away from the battery body, to define a first mounting countersink; and the connecting sleeve is capable of being detachably connected to a first mounting countersink of another battery, and the connecting sleeve has an electrical contact surface at a free end that is in surface contact with the second electrode end plate, wherein a winding core assembly is disposed in the battery body, the winding core assembly is formed by sequentially overlapping a positive electrode membrane, a first insulating film, a negative electrode membrane and a second insulating film and wound into several turns, each turn of the positive electrode membrane is connected to a respective first electrode plate that extends out of the winding core assembly, the first electrode plates are all connected to a first converging piece, the first converging piece is electrically connected to the second electrode end plate, each turn of the negative electrode membrane is connected to a respective second electrode plate that extends out of the winding core assembly, the second electrode plates are all connected to a second converging piece, and the second converging piece is electrically connected to the first electrode end plate.

2. The battery of claim 1, wherein
the first mounting countersink is provided with a first internal thread on an inner wall surface, and the connecting sleeve is provided with a first external thread matching the first internal thread.

3. The battery of claim 1, wherein
the first electrode end plate has a contour edge extending along the length direction of the battery body and away from the battery body, to define a second mounting countersink, and the connecting sleeve is detachably disposed in the second mounting countersink.

4. The battery of claim 3, wherein
the second mounting countersink is provided with a second internal thread on an inner wall surface, and the connecting sleeve is provided with a second external thread matching the second internal thread.

5. The battery of claim 1, wherein
the connecting sleeve comprises a cylindrical part, and the electrical contact surface is arranged on a lower end face of the cylindrical part and extends inwards to close or shrink a lower opening of the cylindrical part.

6. The battery of claim 1, wherein
the battery body comprises a barrel-shaped housing, the first electrode end plate and the second electrode end plate are disposed at two ends of the barrel-shaped housing respectively to form a housing assembly, the winding core assembly is accommodated in the housing assembly, the first converging piece is clamped between the winding core assembly and the second electrode end plate, and the second converging piece is clamped between the winding core assembly and the first electrode end plate.

7. The battery of claim 1, wherein
one of the positive electrode membrane and the negative electrode membrane protrudes upward from the integral winding core assembly, and the other protrudes downward from the integral winding core assembly.

8. The battery of claim 1, wherein
the first electrode plate is fixed by welding to the first converging piece, and the second electrode plate is fixed by welding to the second converging piece.

* * * * *